US010664521B2

(12) United States Patent
Gardner et al.

(10) Patent No.: US 10,664,521 B2
(45) Date of Patent: May 26, 2020

(54) LYRICAL MESSAGING AND METHOD OF PROVIDING

(71) Applicant: Strata-G Lyrical Concepts, LLC, Loyalhanna, PA (US)

(72) Inventors: Adam Currie Gardner, Ligonier, PA (US); Addie May Gardner, Ligonier, PA (US)

(73) Assignee: Strata-G Lyrical Concepts, LLC, Loyalhanna, PA (US)

( * ) Notice: Subject to any disclaimer, the term of this patent is extended or adjusted under 35 U.S.C. 154(b) by 131 days.

(21) Appl. No.: 16/046,985

(22) Filed: Jul. 26, 2018

(65) Prior Publication Data

US 2019/0034527 A1 Jan. 31, 2019

Related U.S. Application Data

(60) Provisional application No. 62/537,591, filed on Jul. 27, 2017.

(51) Int. Cl.
*G06F 16/683* (2019.01)
*H04W 4/12* (2009.01)
*H04L 12/58* (2006.01)

(52) U.S. Cl.
CPC .......... *G06F 16/685* (2019.01); *H04L 51/22* (2013.01); *H04W 4/12* (2013.01); *H04L 51/10* (2013.01); *H04L 51/38* (2013.01)

(58) Field of Classification Search
CPC .......... H04L 51/38; H04L 51/10; H04W 4/12; G06F 17/30746
See application file for complete search history.

(56) References Cited

U.S. PATENT DOCUMENTS

| | | | |
|---|---|---|---|
| 9,262,522 B2 | 2/2016 | Guthery et al. | |
| 9,813,366 B2 | 11/2017 | Guthery et al. | |
| 9,819,622 B2 | 11/2017 | Guthery et al. | |
| 2013/0205243 A1* | 8/2013 | Rivera | G06F 3/04817 715/776 |
| 2014/0337761 A1* | 11/2014 | Glass | H04L 65/403 715/753 |

OTHER PUBLICATIONS https://gifnote.com/; Jul. 18, 2018; 4 pages.
Send an Audio Message to an iPhone or Mac from Messages in Mac OS X, Dec. 2, 2014, http://osxdaily.com/2014/12/02/send-audio-messages-from-mac-os-x/; 7 pages.

* cited by examiner

*Primary Examiner* — El Hadji M Sall
(74) *Attorney, Agent, or Firm* — Craig R. Rogers; Simple IP Law, P.C.

(57) ABSTRACT

According to principles of the present inventive concepts, a keyboard plug-in for a MMS application permits a user to search a database of lyrical segments to include within a messaging conversation as a message to a recipient. A search bar permits the user to enter a search query. A display area displays search results received from the database containing lyrical segments with lyrical content related to the user-supplied search query. Upon selection of a desired search result, the lyrical segment is copied and pasted into a messaging box of the user's MMS application and is transmitted to a recipient when the user sends the message. Upon receipt of the message containing the lyrical segment, the recipient plays the lyrical segment on their messaging device by clicking the message.

20 Claims, 2 Drawing Sheets

LYRICAL MESSAGING AND METHOD OF PROVIDING

PRIORITY CLAIM

Priority Application Benefit Claim

This application is a non-provisional of, and claims priority from, U.S. Provisional Patent App. Ser. No. 62/537,591, filed Jul. 27, 2017, the contents of which are incorporated herein by reference in their entirety.

BACKGROUND OF THE INVENTION

Field of the Invention

This invention relates generally to communications between remote device users, such as through text messaging and other multimedia messaging services (MMS).

Related Art

Typical text messaging conversations may include text, emojis, images, memes, videos, or even sounds. However, conventional messaging services lack a plug-in keyboard that provides the ability to search and provide pre-recorded musical segments from a database of lyrical sound clips that are selected and provided based on lyrical elements.

SUMMARY OF THE INVENTION

According to various embodiments and principles of the present inventive concepts, a messaging interface gives electronic messaging users the ability to say exactly what they want to say to a recipient through selected lyrical segments of pre-recorded musical compositions of various recording artists. Rather than simply sending a message as a written text, they search a database of lyrical segments of pre-recorded musical compositions and select a lyrical phrase that they wish to communicate to the recipient. The lyrical segment is copied and pasted into the message box of the user's messaging interface and is then sent to the recipient. Once received, the recipient clicks on the audio attachment to listen to the lyrical segment.

A multimedia messaging service (MMS) according to these inventive concepts therefore provides the ability to select a desired lyrical segment from a database of preselected audio segments of pre-recorded musical compositions based on the lyrical elements of the audio segments, and then transmit the selected lyrical segment to an intended recipient. The MMS thereby provides users with the ability to communicate through song lyrics using musical segments from the song artists themselves.

The database may, for example, be a large database comprising licensed and/or public domain pre-recorded musical compositions from a large variety of recording artists. The database should further comprise the lyrics for the musical compositions and provide the ability to select specific lyrical segments from each of the musical compositions based on lyrical elements.

In a preferred embodiment, the database comprises lyrical segments consisting of pre-selected audio segments of the pre-recorded musical compositions. The pre-selected audio segments should be selected based on their lyrical content and the database should provide the ability to search through and select specific desired lyrical segments based on the lyrical content. The preselected lyrical segments can thereby be readily searched using user input from the messaging interface.

The user input may, for example, be a text input used by the MMS to search the database of lyrical segments. Alternatively, the user input may, for example, be a selection of a lyrical message from a list of personal favorites or an MMS provided list of suggestions. The MMS may further allow searching by artist, song, genre, or any other desirable criteria. The search results can be ranked based on relevancy, trending status, or other desired ranking criteria. Once the user selects the desired lyrical segment from the selection of lyrical segments provided by the MMS, the selected lyrical segment can be included in the message (for instance, as a link or attachment) and can replace or accompany any user supplied text.

According to a further aspect of the present invention, once a desired lyrical segment has been selected from the database and included in the user's message, the user may transmit the message including the audio lyrical segment to a recipient through the MMS. For instance, once a desired lyrical segment has been chosen, the user clicks on the desired lyrical segment to select, copy, and paste it into the message bar of the text messaging interface. The user then transmits the message to the intended recipient in the same way as a conventional text.

The lyrical segment may be accompanied by any additional desired text, image, video, or other multimedia content, or it may be sent independently of any other content. The audio lyrical message can be configured to play immediately and automatically upon receipt by the recipient, or it may be configured to play upon selection by the recipient.

In a preferred embodiment, a keyboard plug-in can be downloaded and installed by a user. The keyboard plug-in can provide an additional user interface within the user's own, conventional electronic messaging application. The keyboard can be accessed, for example, by clicking an icon or other link that opens the keyboard interface. The user inputs a search query into a search bar of the keyboard interface and the search results are then displayed in a search result display area of the keyboard interface. The user can preview the selections by tapping on a play icon of the desired result in the search area to listen to the selected lyrical segment.

Once identified, the desired lyrical segment is copied from the displayed search results and pasted into the message box of the electronic messaging interface. The pre-recorded musical phrase is then sent to the recipient as an attachment instead of a simple text message. Once received, the recipient clicks on the message to play the attached audio file containing the selected lyrical segment.

In an alternative embodiment, the user may be permitted to search the database in various other ways, such as by artist, by song, by genre, or any other desired search criteria. The user may further be permitted to preselect a number of lyrical segments as favorites which are then made readily available to the user by quick links or other shortcuts.

In addition to providing the lyrical segments, the user and/or the recipient can be provided the ability to get more information on MMS platform as well as on the musical composition from which the lyrical segment has been obtained. This additional information could include, for instance, information on where to download the MMS plug-in, or song information such as song title, artist, album, date, as well as the ability to purchase a full version of the song through a musical service provider (e.g., iTunes or other provider).

By providing an audio file containing lyrics from pre-recorded musical compositions, senders can grab the recipient's attention much more effectively than they could through a traditional text. The novelty associated with receiving an audio file and the additional stimulus provided by the audio message is much more likely to illicit a response than a simple written text. In addition, the lyrical message reduces the likelihood of misunderstandings that can easily occur with simple text messaging, as the audio segment makes things like tone, sarcasm, humor, anger, etc., far easier to detect.

Various further aspects, embodiments, and configurations of this invention are possible without departing from the principles disclosed herein. This invention is therefore not limited to any of the particular aspects, embodiments, or configurations described herein.

BRIEF DESCRIPTION OF DRAWINGS

The foregoing and additional objects, features, and advantages of the present invention will become more readily apparent from the following detailed description of preferred embodiments, made with reference to the accompanying drawings, in which.

DETAILED DESCRIPTION OF ILLUSTRATIVE EMBODIMENTS

Various features, benefits, and configurations incorporating the principles of the present inventive concepts in an illustrative embodiment are shown in the accompanying drawings. Additional features, benefits, and configurations will be readily apparent to those of ordinary skill in the art based on this disclosure, and all such features, benefits, and configurations are considered within the scope of the present invention. Various embodiments will now be described in further detail in connection with the accompanying drawings.

Figure 1:
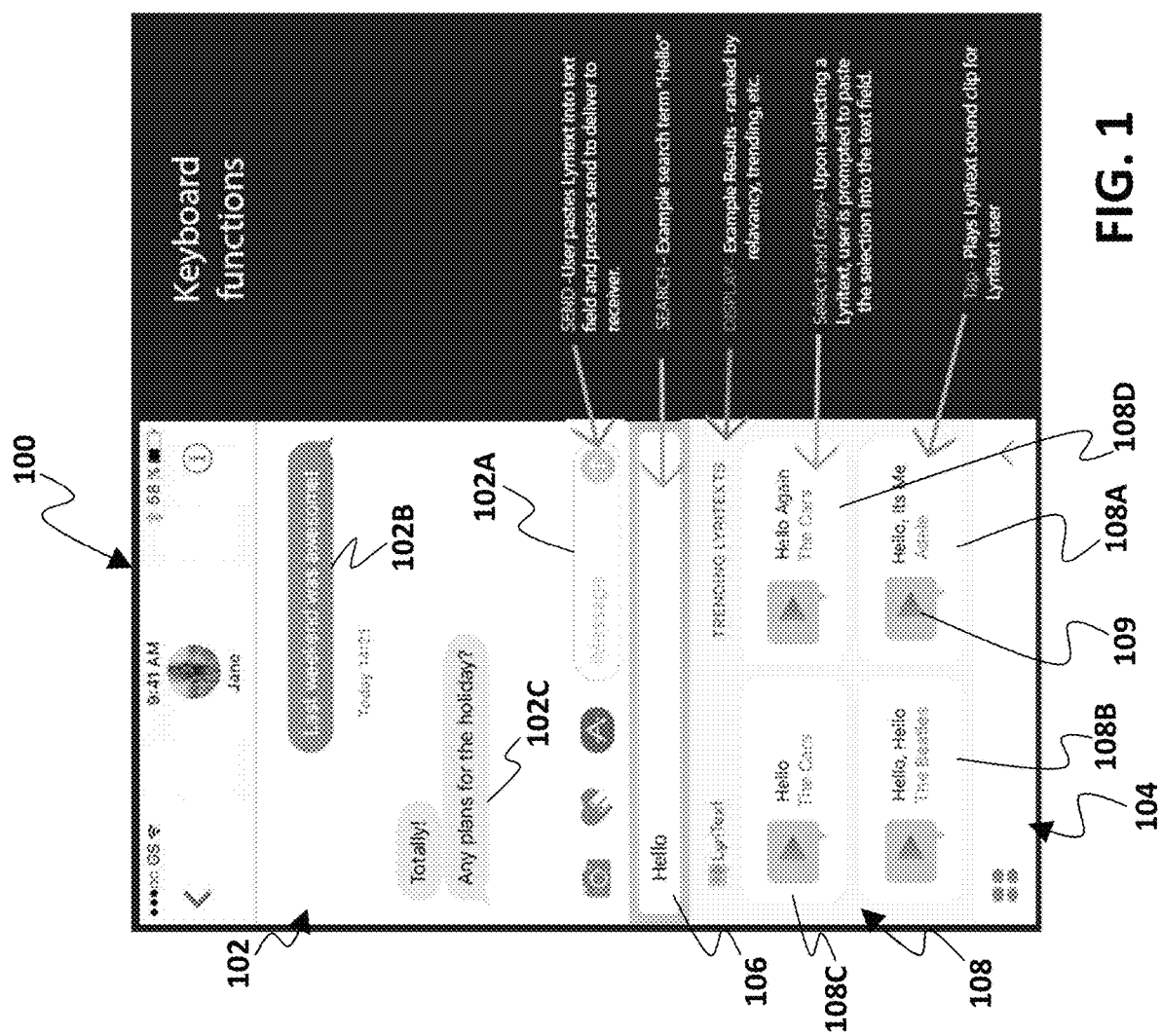
FIG. 1 is a somewhat schematic view of a display screen for an electronic messaging device illustrating a messaging interface allowing the search for and transmission of lyrical segments of pre-recorded musical compositions according to principles of the present inventive concepts.
Figure 2:
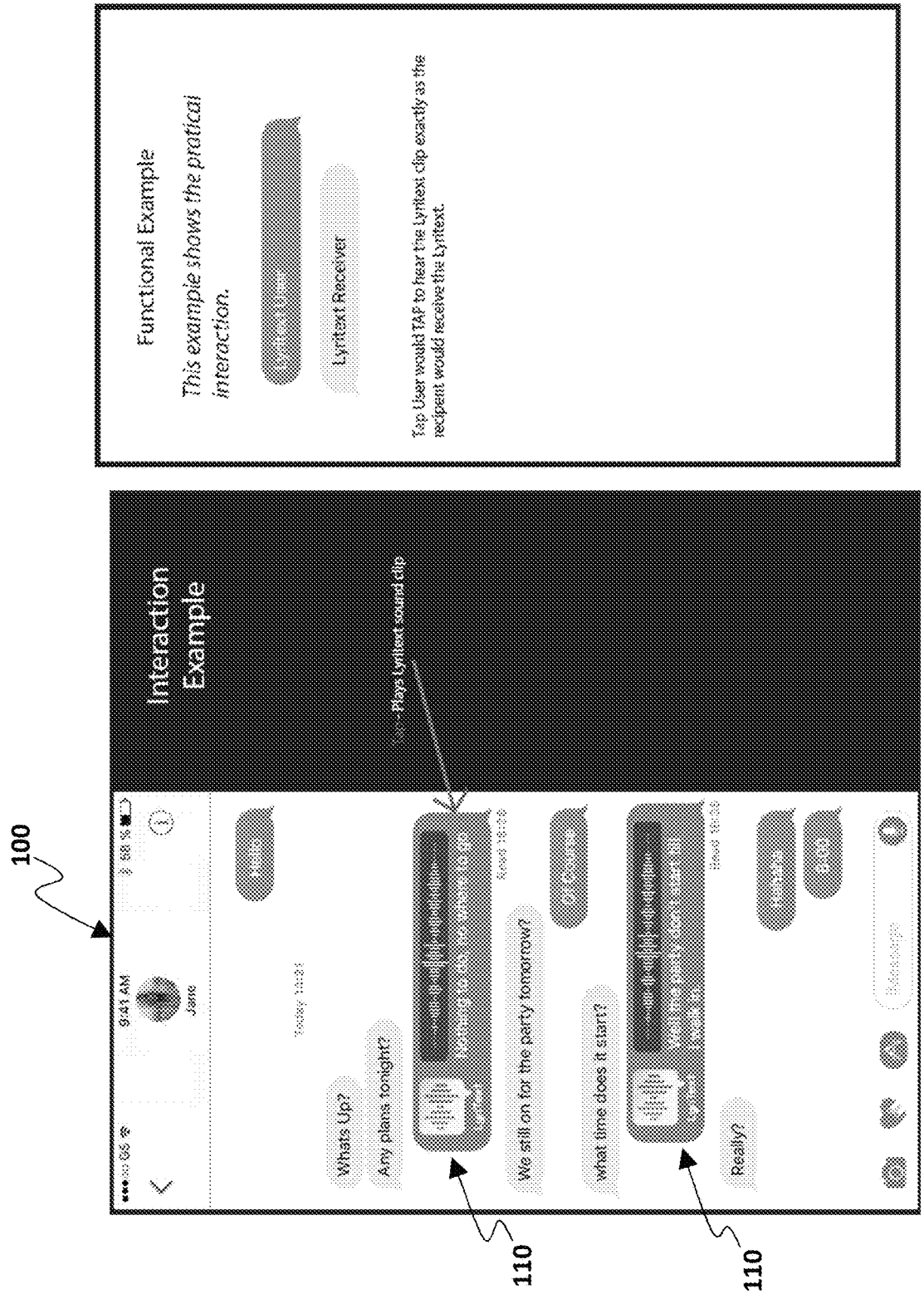
FIG. 2 is a somewhat schematic view of the display screen of FIG. 1, illustrating an electronic messaging conversation including lyrical segments.

FIG. 1 is a somewhat schematic view of a display screen 100 for an electronic messaging device illustrating a messaging interface 108 that allows for the search for and transmission of lyrical segments 108A of pre-recorded musical compositions according to principles of the present inventive concepts. FIG. 2 is a somewhat schematic view of the display screen 100 of FIG. 1, illustrating an electronic messaging conversation including messages 110 consisting of lyrical segments.

Referring to FIGS. 1 and 2, according to an embodiment of the present inventive concepts, a multimedia messaging service (MMS) provides the ability to select a desired lyrical segment 108A from a database based on the lyrical elements of the audio segment, and then transmit the selected lyrical segment 108A to an intended recipient as part of an electronic message 110. The MMS thereby provides the ability to communicate through an audio file containing song lyrics selected from pre-recorded musical compositions.

In one embodiment, the database comprises a large number of lyrical segments consisting of pre-selected audio segments of licensed or public domain pre-recorded musical compositions from various artists. The pre-selected audio segments are selected based on their lyrical content and the database should provide the ability to search through and select specific desired audio segments based on the lyrical content. These lyrical segments can thereby be readily searched using user input received from the messaging interface. The search results can be ranked, for example, by their closeness to the search query (i.e., relevancy), their trending status, sponsorship, or other desired ranking criteria.

A commercial embodiment utilizing the principles of the present invention is the "LyriText" keyboard plug-in developed by Strata-G Lyrical Concepts, LLC. The LyriText keyboard 104 provides a plug-in keyboard for a conventional text messaging interface 102 that gives text messaging users the ability to say exactly what they want to say to a recipient through a selected lyrical segment 108A of a pre-recorded musical composition. Rather than simply sending a message as a written text, they search a database of lyrical segments of pre-recorded musical compositions and select a lyrical segment 108A containing a lyrical phrase that they wish to communicate to the recipient.

In the commercial embodiment, the user downloads and installs the LyriText keyboard plug-in 104 onto their electronic messaging device. The LyriText keyboard 104 then appears on the display screen 100 of the electronic messaging device as an additional interface within the user's existing text messaging interface 102 which can be accessed, for instance, by clicking on an associated icon (not shown). Once opened, the user accesses the search feature of the LyriText keyboard 104 by tapping on the keyboard's search box 106 and then begins typing the text of a desired lyrical message. Based on the text input in the search box 106, the LyriText MMS searches the database and returns links 108A-108D to a number of audio lyrical segments from musical compositions that contain or otherwise relate to the text input. The search results 108A-108D are displayed in a results area 108 of the keyboard interface 104.

The user can preview the lyrical segments 108A-108D by clicking on a play 109 or other icon of the lyrical segments 108A-108D. Once a desired lyrical segment 108A has been chosen, the user clicks a link, button, or other icon corresponding to the desired lyrical segment 108A to copy and paste that selected lyrical segment 108A into the message box 102A of the text messaging interface 102. The user-selected lyrical segment 108A is then included in the message 110 as an attachment and can be transmitted to a recipient by clicking the send button. When the recipient receives the LyriText message 110, the recipient clicks on the message 110 to play the audio lyrical segment 108A, or the recipient could be provided with the option to play the audio messages automatically. The message 110 including the audio content could further include a textual display of the lyrical phrase contained in the lyrical segment 108A.

Of course, alternative embodiments are also possible. The database may, for example, be a large database comprising licensed and/or public domain pre-recorded musical compositions from a large variety of recording artists. The database may further comprise all of the lyrics for the musical compositions and provide the ability to select specific lyrical segments from each of the musical compositions based on lyrical elements.

Although the user input of the illustrated embodiment comprises textual input of desired lyrics that is used by the MMS to search the database for a lyrical match, the user input may, alternatively, be a selection of a lyrical message from a list of personal favorites or from an MMS provided list of suggestions. The MMS may further allow searching by artist, song, genre, or any other desirable criteria. Regardless of the search and selection method, once the user selects the desired lyrical segment from the selection of lyrical segments provided by the MMS, the selected lyrical segment can be included in the message (for instance, as a link or attachment) and can replace or accompany any user supplied text.

Of course, the lyrical segment may be accompanied by any additional desired text, image, video, or other multimedia content, or it may be sent independently of any other content. The audio lyrical message can be configured to play immediately and automatically upon receipt by the recipient, or it may be configured to play upon selection by the recipient.

In alternative embodiments, the user may be permitted to search the database in various other ways, such as by artist, by song, by genre, or any other desired search criteria. The user may further be permitted to preselect a number of lyrical segments as favorites which are then made readily available to the user by quick links or other shortcuts.

In addition to providing the lyrical segments, the user and/or the recipient can be provided the ability to get more information on the musical composition from which the lyrical segment has been obtained. This additional information could include, for instance, song title, artist, album, date, as well as the ability to purchase a full version of the song through a musical service provider (e.g., iTunes or other provider). The recipient could also be provided with other information, such as the provider of the application, plug-in, or service providing the lyrical segment, as well as information on where to obtain or access the software and/or service.

Ways of monetizing the service are also contemplated, such as, for instance, through a subscription service arrangement, database access charges, per use charges, or charges for downloading the app or plug-in.

Having described and illustrated principles of the present invention in various preferred embodiments thereof, it should be apparent that the invention can be modified in arrangement and detail without departing from such principles.

What is claimed is:

1. A keyboard plug-in for a Multimedia Messaging System (MMS) application, comprising:
    a search bar for receiving user text input comprising a search query, wherein the search query is used to search a database comprising a plurality of lyrical segments, wherein said lyrical segments are short musical segments containing lyrical content taken from musical compositions, and wherein a pre-selected number of lyrical segments are supplied from the database to the keyboard plug-in based on a comparison between the lyrical content of the lyrical segments and the search query;
    a display area for displaying the pre-selected number of lyrical segments returned from the database; and
    wherein, upon user selection of a desired lyrical segment from among the pre-selected number of lyrical segments displayed in the display area, the desired lyrical segment is copied and pasted into a message field of the MMS application and is transmitted to a recipient when the user initiates a send operation of the MMS application.

2. A keyboard plug-in according to claim 1, wherein the database comprises lyrical segments but not entire musical compositions.

3. A keyboard plug-in according to claim 1, wherein the pre-selected number is four.

4. A keyboard plug-in according to claim 1, wherein the displayed lyrical segments in the display area can be previewed by clicking on a play icon associated with the displayed lyrical segment desired to be previewed.

5. A keyboard plug-in according to claim 1, wherein said keyboard plug-in is configured to operate within the user's pre-existing MMS application.

6. A keyboard plug-in according to claim 1, wherein said keyboard plug-in is downloaded by a user and installed in the user's electronic messaging device to operate within the user's pre-existing MMS application.

7. A keyboard plug-in according to claim 1, wherein the database supplies lyrical segments to the keyboard plug-in containing lyrical content that is similar or identical to the search query.

8. A keyboard plug-in according to claim 1, wherein the display area further displays information relating to the lyrical segment.

9. A keyboard plug-in according to claim 8, wherein the information comprises one or more of the following: the lyrical content, a name of an artist performing the musical composition from which the lyrical segment was taken, a name of the musical composition from which the lyrical segment was taken, and a name of an album containing the musical composition from which the lyrical segment was taken.

10. A keyboard plug-in according to claim 1, wherein the display area displays one or more lyrical segments based on information not directly related to the search query.

11. A keyboard plug-in according to claim 10, wherein the information not directly related to the search query comprises one or more of the following:
    trending lyric requests, user favorites, and sponsored results.

12. A method for communicating using lyrical segments via an MMS, said method comprising:
    receiving a user-entered search query into a search field of a user's messaging device;
    searching an online database of lyrical segments taken from musical compositions to identify lyrical segments containing lyrical content similar or identical to the search query;
    displaying a plurality of search results corresponding to the identified lyrical segments within a display area of a user's messaging device;
    upon selection of a desired lyrical segment by the user, copying and pasting the selected lyrical segment into a messaging field of the user's messaging device; and
    transmitting the desired lyrical segment to a recipient.

13. A method according to claim 12, further comprising:
    receiving the transmitted lyrical segment into a messaging device of a recipient;
    displaying an image or text associated with the lyrical segment within a message display area of the recipient's messaging device; and
    upon selection of the associated image or text by the recipient, playing the lyrical segment on the recipient's messaging device.

14. A method according to claim 12, wherein the online database comprises lyrical segments taken from musical compositions, but does not contain any complete musical compositions.

15. A method according to claim 12, further comprising causing a selected one of the search results to play on the user's messaging device in response to user selection of a play icon associated with the selected search result in order to permit the user to preview one or more of the search results.

16. A Multimedia Messaging Service (MMS) comprising:
- a searchable database containing a plurality of lyrical segments, said lyrical segments each comprising a short musical segment containing lyrical content taken from a musical composition;
- a keyboard plug-in configured to be installed in a user's messaging device and to interface with the user's MMS application, said keyboard plug-in providing a search field configured to receive a user-entered search query and a display area configured to display search results;
- wherein the user-entered search query is used to search the database and return search results containing lyrical segments having lyrical content related to the search query; and
- wherein user selection of a desired search result causes the lyrical segment associated with the selected search result to be copied and pasted into a messaging field of the user's MMS application.

17. A MMS according to claim 16, wherein after selection of the desired search result, user selection of a send button in their MMS application is configured to cause the lyrical segment to be transmitted to a recipient.

18. A MMS according to claim 17, wherein the MMS causes the recipient to receive the lyrical segment into their MMS application as a link or attachment.

19. A MMS according to claim 18, wherein the MMS plays the transmitted lyrical segment on the recipient's messaging device upon selection of the message containing the lyrical segment by the recipient.

20. A MMS according to claim 16, wherein the display area further displays additional information related to the lyrical segment including the lyrical content, a name of the artist performing the musical composition from which the lyrical segment was taken, or a name of the musical composition from which the lyrical segment was taken.

\* \* \* \* \*